W. H. APPLEMAN.
DEVICE FOR STEERING VEHICLES.
APPLICATION FILED OCT. 27, 1913.
1,150,161.
Patented Aug. 17, 1915.
3 SHEETS—SHEET 3.
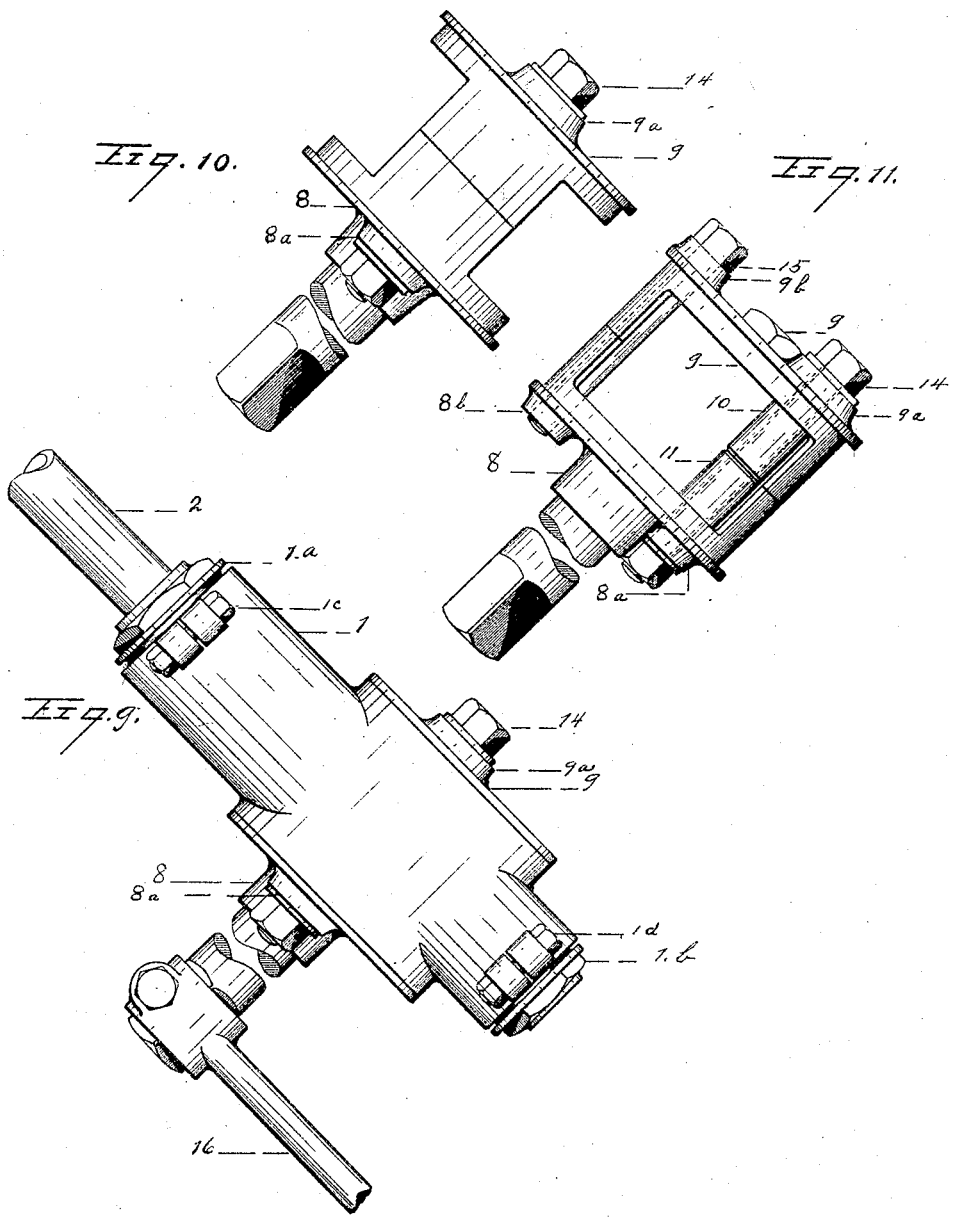
WITNESSES:
INVENTOR.

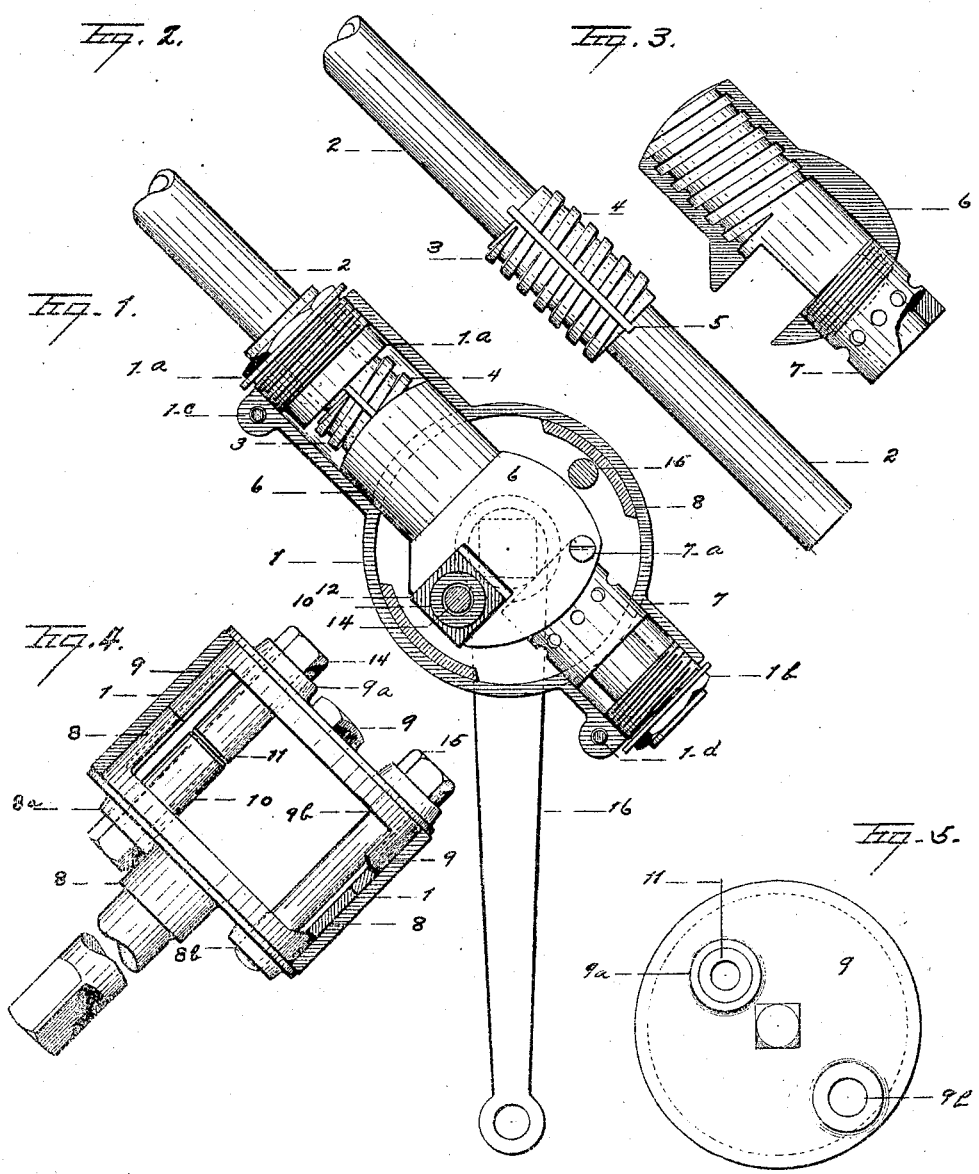

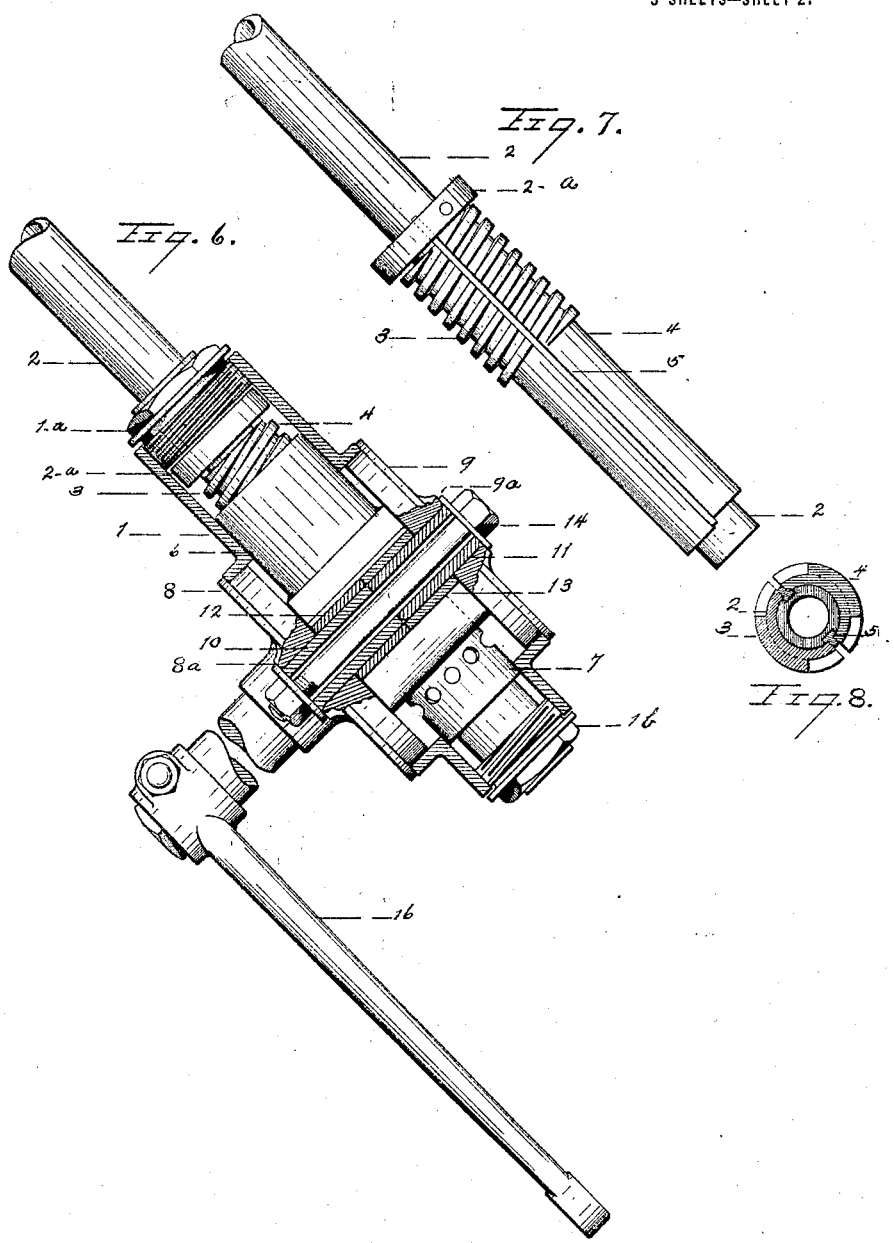

UNITED STATES PATENT OFFICE.

WILLIAM H. APPLEMAN, OF BELMONT, NEW YORK.

DEVICE FOR STEERING VEHICLES.

1,150,161.   Specification of Letters Patent.   Patented Aug. 17, 1915.

Application filed October 27, 1913. Serial No. 797,590.

*To all whom it may concern:*

Be it known that I, WILLIAM H. APPLEMAN, a citizen of the United States, residing at Belmont, in the county of Allegany, in the State of New York, have invented a new and useful Device for Steering Vehicles, of which the following is a specification.

My invention relates to improved methods for imparting motion to what is known as the steering arm of steering devices.

The object of my invention is to provide means for eliminating lost motion in case of wear, reduce the cost of construction, and render the internal parts of the device far more accessible than those in devices now in use for a similar purpose.

I attain the objects of my invention by the mechanism illustrated in the accompanying drawing, in which, Figure 1 is a side elevation view partly in section with portions removed in order to afford an unobstructed interior view. Fig. 2 is a side elevation view of the steering post of my device including also the threaded members carried thereby. Fig. 3 is a side elevation interior view of an actuating nut which encircles the steering post and threaded members shown in Fig. 1 and Fig. 2. Fig. 4 is a top view partly in section of an assembled rocking member as used and partly shown in Fig. 1 and in which its relation to portions of the casing of Fig. 1 is also shown. Fig. 5 is an external plan view of the right hand circular plate of the rocking member shown in Fig. 1 and Fig. 4. Fig. 6 is a rear elevation view of my device partly in section with portions removed in order to better reveal interior parts. Fig. 7 is a modification or an interchangeable substitute for Fig. 2. Fig. 8 is a cross sectional view of Fig. 2 and Fig. 7 taken through the threaded portions thereof. Fig. 9 may be considered as a rear elevation of my device assembled complete although front and rear views are approximately the same. Fig. 10 is a rear side elevation of the rocking member of my device viewed at a right angle from the steering post. Fig. 11 is an assembled view of the same as it would appear when viewed from the upper end of the steering post.

Like symbols indicate like parts throughout the various figures.

A suitable housing 1 is provided for supporting the various parts of my device. It comprises a longitudinal chamber which is divided by an enlarged transverse chamber the entire inner walls of both are machined, also the lateral faces of the walls of the transverse chamber, the external openings of the longitudinal chamber being fitted with externally threaded and adjustable sleeves 1$^a$ and 1$^b$ both of which are locked in position by compression bolts 1$^c$ and 1$^d$. A steering post 2 is inserted in said longitudinal chamber, its lateral position being maintained by said sleeves 1$^a$ and 1$^b$. A pair of externally threaded members, 3 and 4 resulting from longitudinally dividing an externally threaded sleeve, are located on opposite sides of steering post 2, section 3 being rigidly attached to said steering post while section 4 which is so located on steering post 2 that its threads match those of section 3, is also free to move laterally upon said steering post. The upper end of section 3 however is shortened in order that when sleeve 1$^a$ rests against section 4, said sleeve 1$^a$ can by no means contact with section 3. One or more keys 5 are inserted in steering post 2 directly between the approaching edges of sections 3 and 4 of said longitudinally divided and externally threaded sleeve, for the purpose of rotating them as well as maintaining them and steering post 2 in a fixed rotatable relation to each other. A sleeve nut 6 encircles threaded members 3 and 4 and moves longitudinally thereon, said nut has its threaded chamber near its upper end, and for convenience of manufacture is counter bored throughout the remainder of its length, after which it is bushed to fit slidingly on steering post 2 by the insertion of sleeve 7. The upper end of nut 6 is externally machined to slidingly fit the bore of housing 1 while the lower portion is enlarged, said enlargement being rectangular and machined flat upon opposite sides, and also provided with a deep slotted opening near its center which lies at right angles with steering post 2. A rocking member consisting primarily of circular plates 8 and 9 are held definitely apart by spacing extensions thereof, is inserted into the transverse chamber of housing 1, said plates being flanged and machined in such manner as to slidingly fit internally, as well as laterally against the walls of said transverse chamber. The inner faces of said plates are also machined and rest slidingly against the flatted faces of nut 6 thereby guiding and guarding it against rotation. Plates 8 and 9 are each provided with corresponding bosses 8ª and 9ª, and also bolt holes 8ᵇ and 9ᵇ, the latter being the larger or slightly slotted. Tubular crank arms 10 and 11 are rigidly inserted in bosses 8ª and 9ª and meet midway between plates 8 and 9. Rectangular thimbles 12 and 13 are fitted upon crank arms 10 and 11, said thimbles being machined externally to a sliding fit in the slotted opening in the enlargement of nut 6. A bolt 14 of less diameter than the tubular openings through crank arms 10 and 11 passes through said arms while a second bolt 15 of less diameter than bolt hole 9ᵇ passes through opening 9ᵇ in plate 9, and screws into threaded opening 8ᵇ in plate 8, thereby joining with bolt 14 in binding plates 8 and 9 rigidly together upon their spacing extensions. A steering arm 16 may be integrally attached to either plate 8 or 9 or may be attached by a shaft like extension as shown in Figs. 4, 6 and 9.

My device is assembled by first inserting nut 6 less bushing 7 into housing 1 through the opening formed by the transverse chamber. Bushing 7 is then inserted and screwed firmly into nut 6 and while not necessary may also be further secured by set screw 7ª. Steering post 2 along with its separable threaded members 3 and 4 are then inserted through the upper opening of housing 1 and after being brought to their proper position are maintained, there by sleeve 1ª which bears against the top of threaded member 4 and by sleeve 1ᵇ which presents a counter bored socket or seat against the bottom of steering post 2. Plates 8 and 9 with their crank arms 10 and 11 along with thimbles 12 and 13 are then inserted from opposite sides of housing 1, crank arm 10 and 11 with thimble 12 and 13 at the same time being entered into the slotted opening in nut 6, the insertion then and tightening up of bolts 14 and 15 renders the device ready for operation. Turning steering post 2 along with its threaded members 3 and 4 to either the right or left causes nut 6 to move longitudinally thereon, and as crank arms 10 and 11 of the rocker enter in the slotted opening in nut 6, said rocker is thereby caused to rock or oscillate in a corresponding direction.

In making adjustments to eliminate wear, it will be found that screwing sleeve 1ª inward, causes it to force threaded member 4 (which is free on steering post 2) downward, carrying nut 6 with it until it is resisted by threaded member 3, the latter being unable to yield by reason of its being attached to steering post 2, the lower end of which rests against sleeve 1ᵇ. The foregoing operation eliminates all wear between the threaded members 3 and 4 and nut 6, as well as lateral movement of steering post 2, after which by slackening bolts 14 and 15 and by them attempting to rotate plates 8 and 9 in opposite directions as far as possible and then tightening bolts 14 and 15, all wear between crank arms 10 and 11 and their thimbles 12 and 13 as well as between said thimbles and nut 6 is eliminated. It will also be found that this adjustment may be made in either direction, the total range of said adjustment being equal to just twice the difference between the diameter of bolts 14 and 15 and the openings through which they are loosely inserted.

In the modification presented by Fig. 7 threaded members 3 and 4 are both loose or free on steering post 2. They are also separated by key type spacers 5 let into and secured to steering post 2, and thereby serve to cause the former to rotate along with said steering post. Steering post 2 is then maintained in its proper lateral position by reason of collar 2ª which is attached to said steering post, and which is also confined between sleeve 1ª and threaded member 4, the latter being longitudinally resisted when assembled by the intervention of nut 6 and threaded member 3, owing to the fact that the lower end of threaded member 3 rests against the upper end sleeve 1ᵇ while threaded member 4 is shortened at its lower end and does not.

When the modification set forth by Fig. 7 is substituted for the equivalent parts in Figs. 1 and 2 it only becomes necessary to enlarge the bore of sleeve 7 to a sliding fit upon the blank extensions of threaded members 3 and 4 of Fig. 7 instead of its fitting the steering post. All adjustments for eliminating wear when said modification is employed are identical with those in the device as previously described.

I claim—

1. The combination of a housing, a rotatable steering post entering therein and carrying separate externally threaded members arranged longitudinally side by side thereon, said threaded members being adjustably related, a single nut encircling, engaging with, and moving longitudinally upon said threaded members, a rocker journaled in said housing carrying two crank arms which are separable and adjustably related rotatably, and means of engagement between said nut and both of said crank arms.

2. The combination of a housing, a rotatable steering post entering therein and carrying separable externally threaded member arranged side by side longitudinally, said threaded members being adjustably related, a single nut engaging with both of said threaded members, an abutment on said nut containing a slotted opening lying transversely with the body of said nut, a rocker journaled in said housing carrying two crank arms which are separable and adjustably related rotatably, and both of which enter said slotted opening in said abutment of said nut.

3. The combination of a housing, a rotatable steering post entering therein, a thread thereon, a single nut engaging with and moving longitudinally on said thread, a rocker journaled in said housing carrying two crank arms which are separable and adjustably related rotatably, and means of engagement between said nut and both of said crank arms.

4. The combination of a housing, a rotatable steering post entering therein, a thread thereon, a rocker journaled in said housing carrying two crank arms which are separable and adjustably related rotatably, a tubular opening through each of said crank arms, a single binding bolt passing through said openings in both of said crank arms, and a means for imparting motion from said thread to said rocker through each of said crank arms.

5. The combination of a housing, a rotatable steering post entering therein and carrying separate externally threaded adjustably related members, arranged side by side longitudinally thereon, a single nut engaging and moving longitudinally on said threaded members, a separable rocker journaled in said housing, one member of which is adjustably related to the other, and means of engagement between said nut and both of said members of said rocker.

W. H. APPLEMAN.

Witnesses:
　W. P. CLARK,
　JOHN WALTON.